United States Patent
Sugiyama

(10) Patent No.: US 6,339,619 B1
(45) Date of Patent: Jan. 15, 2002

(54) MOVING PICTURE BITSTREAM CONVERSION APPARATUS AND METHOD THEREOF

(75) Inventor: Kenji Sugiyama, Yokosuka (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/362,700

(22) Filed: Jul. 29, 1999

(30) Foreign Application Priority Data

Aug. 5, 1998 (JP) .......................................... 10-221438

(51) Int. Cl.$^7$ ................................................. H04N 7/12
(52) U.S. Cl. ............................... 375/240.26; 375/240.02
(58) Field of Search .......................... 375/240, 240.02, 375/240.03, 240.12, 240.13, 240.16, 240.22, 240.23; 348/400–403, 405.1, 415, 416.1, 420.1; 382/232, 236, 238; H04N 7/12

(56) References Cited

U.S. PATENT DOCUMENTS

| | | | | |
|---|---|---|---|---|
| 5,537,440 A | * | 7/1996 | Eyuboglu et al. | 375/245 |
| 5,644,361 A | * | 7/1997 | Ran et al. | 375/240.16 |
| 5,687,095 A | * | 11/1997 | Haskell et al. | 348/286.1 |
| 5,870,146 A | * | 2/1999 | Zhu | 375/240.03 |
| 6,226,328 B1 | * | 5/2001 | Assuncao | 375/240.26 |

FOREIGN PATENT DOCUMENTS

JP          7-50840         2/1995

OTHER PUBLICATIONS

"Study of Encoding Control in Video Re–encoding", pp. 27–28 (PCSJ93) No Translation.

* cited by examiner

*Primary Examiner*—Nhon T Diep
(74) *Attorney, Agent, or Firm*—Jacobson Holman, PLLC

(57) ABSTRACT

A bitstream of moving pictures which has been processed by motion-compensated interframe prediction is converted into another bitstream. The input bitstream is separated into first codes of a predetermined number of intra-coded frames, second codes of frames to be used as reference frames for interframe prediction and third codes of frames other than the frames of the first and second codes. The first and the second codes are decoded to reproduce a first and a second video signal, respectively. The first video signal is encoded by interframe predictive coding using the second video signal as a reference video signal to obtain re-encoded codes. The re-encoded, the second and the third codes are multiplexed to obtain a bitstream for which a video encoding method for the input bitstream is converted. The input bitstream may be separated into first codes of frames not to be used as reference frames for interframe prediction and second codes of frames to be used as the reference frames. The first codes are then separated into codes for interframe prediction and codes of interframe predictive error signals. The codes of interframe predictive error signals are decoded by using variable-length codes. The decoded codes are inversely quantized to reproduce values of the interframe predictive error signals.

4 Claims, 3 Drawing Sheets

→ FRAME ORDER (TIME)

I B B I B B I B B I B B I B B I B B I

I B B P B B P B B P B B P B B I B B P

I B B P B B P B B P B B P B B P B B P

MOVING PICTURE BITSTREAM CONVERSION APPARATUS AND METHOD THEREOF

BACKGROUND OF THE INVENTION

The present invention relates to bitstream conversion in highly efficient encoding of analog video signals to digital signals with a small amount of codes for efficient video transfer, storage and display. Particularly, this invention relates to conversion of bitstreams of frames to be used as reference frames for interframe prediction and other frames not to be used as such reference frames.

Bitstreams of moving pictures encoded by highly efficient coding under the encoding standards such as MPEG standards are converted into other bit streams, for example, at a different data rate or from the variable transfer rate to the fixed transfer rate.

For such conversion, each encoded video data of a bitstream is completely decoded and encoded again (re-encoded) at a data rate different from the data rate for the previous encoding.

A portion of the encoded video data needs not be decoded and re-encoded if the basic encoding processing is the same for the previous encoding and the re-encoding. It can be combined as it is into the re-encoded bitstrearm. Motion vector information used for the previous encoding is also used as it is for the re-encoding without motion vector detection that requires a lot of computation. Motion compensated-interframe prediction is the same for the previous encoding and the re-encoding. Picture degradation caused by re-encoding will be very small due to difference only in quantization between the previous encoding and the re-encoding.

Such bitstream conversion is disclosed, for instance, in 1993 Video Encoding Symposium 1–6 "Study of Encoding Control in video re-encoding".

The bitstream that is subjected to bitstream conversion is a bitstream of moving pictures that has been encoded by motion-compensated interframe predictive coding.

The bitstream is decoded by motion-compensated interframe predictive decoding (called the first processing hereinafter) to reproduce video signals. The reproduced video signals are then re-encoded for bitstream conversion by motion-compensated interframe predictive encoding (called the second processing hereinafter).

The video signals are first subjected to motion-compensated interframe prediction to produce predictive error signals. The predictive error signals are transformed into DCT (Discrete Cosine Transform) coeffieints. The DCT coefficients are quantized at a predetermined stepsize so as to be fixed-length codes. The stepsize is different from the stepsize which has been used for inverse-quantization in the first processing. This stepsize difference depends on the transfer rate to be converted for the bitstream.

The fixed-length codes of DCT coefficients (predictive error signals) and also the motion vectors which have been detected by the first processing are encoded by valiable-length encoding to produce a converted bit stream (for which the transfer rate has been converted).

In these processing, the interframe motion-compensated prediction itself is the same processing for the first processing (decoding) and the second processing (re-encoding for bitstream conversion). Intra-frame processing only seems to be enough without addition and subtraction in the decoding and re-encoding, respectively.

Furthermore, the DCT processing in the second processing (re-encoding for bitstream conversion) is the inverse processing of the inverse-DCT processing in the first processing. Re-quantization in the second processing only seems to be enough without the inverse-DCT in the first processing and the DCT in the second processing.

However, the video signals reproduced by the first processing (decoding) and used as reference frames for prediction and those signals reproduced by the second processing (re-encoding) and also used as reference frames have different quatization errors due to difference in quantization processing in the first and second processing. A little bit different predictive signals thus result in these two processing.

No large errors would be produced for one prediction processing when interframe prediction is simplified as discussed above, such as, intra-frame processing only without addition and subtraction in the first and second processing, respectively. Recursive prediction processing will however accumulate errors to have a big difference between the video signals reproduced by the first and second processing. This causes picture quality to deteriorate.

Furthermore, all the frame types, that is, I frame (intra-coded frame), P frame (predictive-coded frame) and B frame (bidirectionally predictive-coded frame) are subjected to the first and second processing as discussed above. Such processing cause troubles in amount of codes to be processed and picture quality.

Re-quantization of predictive error signals without reproduced video signals is performed in a recursive prediction processing without respect to frame types. Such processing accumulates errors to reduce picture quality.

SUMMARY OF INVENTION

A purpose of the present invention is to provide an apparatus and a method of converting an input bitstream of moving pictures into another bitstream at a transfer rate different from that for the input bitstream with less amount of codes and less reduction in picture quality.

The present invention provides an apparatus for converting a bitstream of moving pictures which has been processed by motion-compensated interframe prediction. The apparatus includes a separator that separates an input bitstream into first codes of a predetermined number of intra-coded frames, second codes of frames to be used as reference frames for interframe prediction and third codes of frames other than the frames of the first and second codes. The apparatus also includes a decoder that decodes the first and the second codes to reproduce a first and a second video signal, respectively, an encoder that encodes the first video signal by interframe predictive coding using the second video signal as a reference video signal to obtain re-encoded codes, and a multiplexer that multiplexes the re-encoded, the second and the third codes to obtain a bitstream for which a video encoding method for the input bitstream is converted.

The present invention provides another apparatus for converting a bitstream of moving pictures which has been processed by motion-compensated interframe prediction. The apparatus includes a frame separator that separates an input bitstream into first codes of frames not to be used as reference frames for interframe prediction and second codes of frames to be used as the reference frames, and a code separator that separates the first codes into codes for interframe prediction and codes of interframe predictive error signals. The apparatus also includes a decoder that decodes the codes of interframe predictive error signals by using variable-length codes and invsersely quantizes the decoded codes to reproduce values of the interframe predictive error signals, a re-encoder that quantizes the reproduced values again and encodes the quantized values by using variable-length codes to obtain re-encoded predictive error signals, a code multiplexer that multiplexes the re-encoded predictive error signals and the codes for interframe prediction to obtain third codes, and a multiplexer that multiplexes the second codes and the third codes to obtain a bitstream to which an amount of codes of the input bitstream is converted.

Moreover, the present invention provides a method of converting a bitstream of moving pictures which has been processed by motion-compensated interframe prediction. An input bitstream is separated into first codes of a predetermined number of intra-coded frames, second codes of frames to be used as reference frames for interframe prediction and third codes of frames other than the frames of the first and second codes. The first and the second codes are decoded to reproduce a first and a second video signal, respectively. The first video signal is encoded by interframe predictive coding using the second video signal as a reference video signal to obtain re-encoded codes. The re-encoded, the second and the third codes are multiplexed to obtain a bitstream for which a video encoding method for the input bitstream is converted.

Moreover, the present invention provides another method of converting a bitstream of moving pictures which has been processed by motion-compensated interframe prediction. An input bitstream is separated into first codes of frames not to be used as reference frames for interframe prediction and second codes of frames to be used as the reference frames. The first codes are then separated into codes for interframe prediction and codes of interframe predictive error signals. The codes of interframe predictive error signals are decoded by using variable-length codes. The decoded codes are invsersely quantized to reproduce values of the interframe predictive error signals. The reproduced values are quantized again and encoded by using variable-length codes to obtain re-encoded predictive error signals. The re-encoded predictive error signals and the codes for interframe prediction are multiplexed to obtain third codes. The second codes and the third predictive errors are multiplexed to obtain a bitstream to which an amount of codes of the input bitstream is converted.

DETAILED DESCRIPTION OF PREFERRED EMBODIMENTS

MPEG standards offer three types of frames, that is, I frame (intra-coded frame), P frame (predictive-coded frame) and B frame (bidirectionally predictive-coded frame). The amounts of generated codes are different from each other among the frame types. In general, the ratio of the code amounts is, for instance, I:P:B=6:2:1.

I and P frames are used as reference frames for interframe prediction. On the contrary, B frames are frames to be predicted only; hence these frames are not to be used as reference frames. P frames located just before I frames are not used as reference frames if a bitstream consists of I and P frames only.

The number of I, P and B frames in a bitstream depends on usage. A bitstream to be transferred via TV broadcasting, such as, satellite broadcasting, terrestrial broadcasting and CATV includes, for instance, one I frame for every 15-th frame (0.5 seconds). This is because a long I frame interval cannot be taken when a bitstream to be decoded is changed by TV channel switching due to the fact that decoding have to wait for the next I frame arrival. Other than I frames, such a bitstream includes a P frame for every 3rd frame and B frames for the other frames for high encoding efficiency.

A broadcasted bitstream to be stored in a storage medium does not require such I frames as one I frame for every 15-th frame due to no TV channel switching in reproduction. One I frame may be allocated for every 60-th frame (two seconds) for refreshing to prevent increase in computation processing errors. Some I frames of broadcasted bitstream for such refreshing are converted into P frames.

Preferred embodiments according to the present invention will be described with reference to the attached drawings.

First Embodiment

Figure 1:
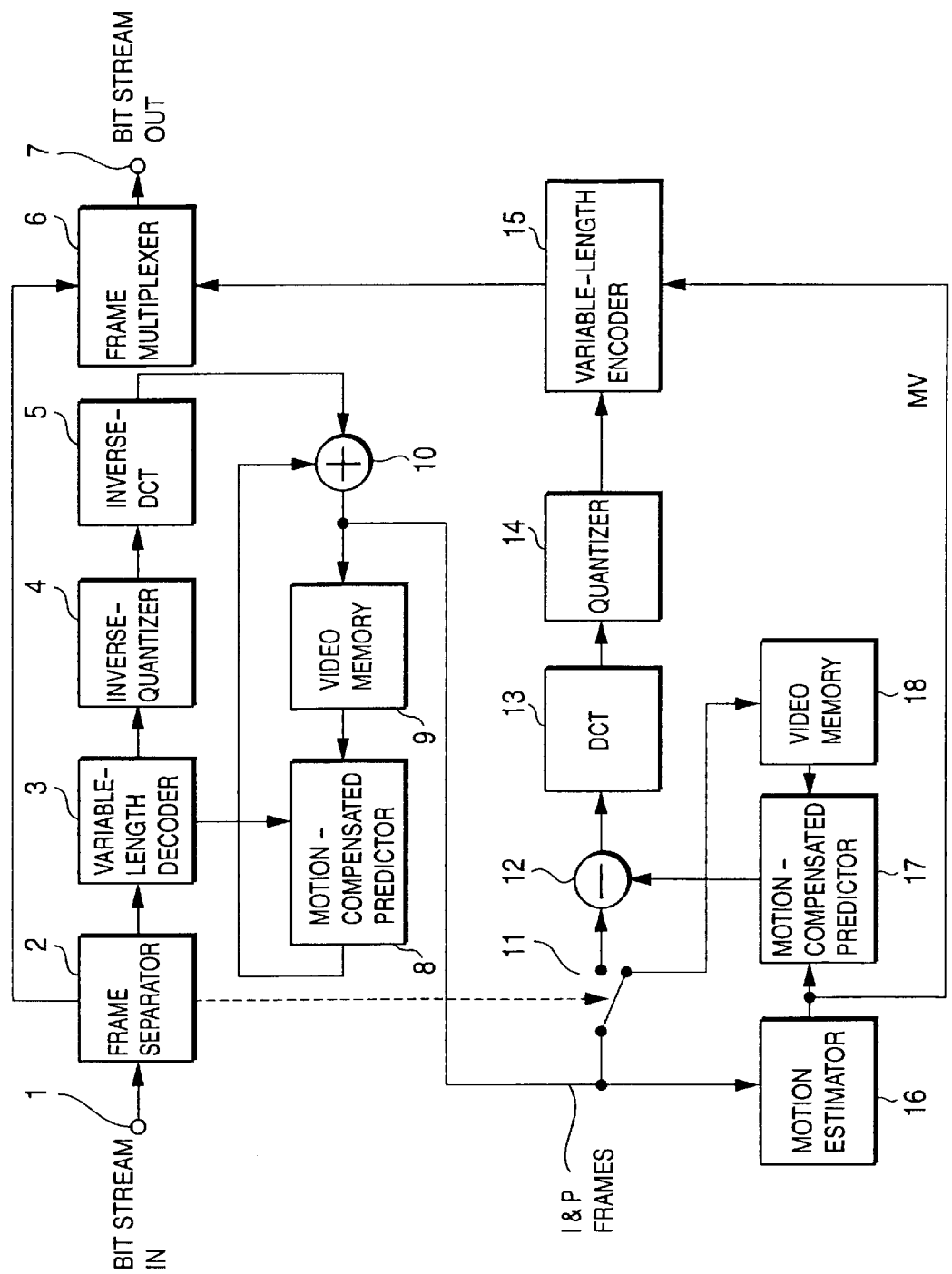
FIG. 1 shows a block diagram of the first preferred embodiment of a moving picture bitstream conversion apparatus according to the present invention.

Shown in FIG.1 is a block diagram of the first preferred embodiment of a moving picture bitstream conversion apparatus according to the present invention. The conversion apparatus shown in FIG. 1 is suitable for storing broadcasted moving picture streams into a storage medium.

(Decoding)

A bitstream that has been encoded by motion-compensated interframe predictive coding is supplied to a frame separator 2 through an input terminal 1. The bitstream is separated into I and P frames to be used as reference frames for prediction, and B frames not to be used as such reference frames. I frames are further separated into first I frames that will be converted into P frames later and second I frames as they are, or that will not to be converted into P frames.

All the frames except the first I frames are supplied to a frame multiplexer 6. One I frame for every 60-th frame or four I frames per bitstream are, for example, set as the second I frame with no conversion. This I frame interval is predetermined and controlled in accordance with a frame number assigned to the header of each frame of the input bitstream. Control information indicating the frame number for controlling the I frame interval is supplied from the frame separator 2 to a switch 11.

The first and second I frames and also P frames are supplied from the frame separator 2 to a variable-length decoder 3 and then the variable-length codes of the I and P frames are converted, or returned to fixed-length codes of DCT (Discrete Cosine Transform) coefficients. The DCT coefficients are inversely quantized by an inverse-quantizer 4 and supplied to an inverse-DCT (Discrete Cosine Transformer) 5.

Each 8×8 number of the DCT coefficients are transformed, or reproduced by the inverse-DCT 5 into a predictive-error signal of a P frame and a video signal of an I frame. The predictive-error signal is supplied to an adder 10. A predictive signal is also supplied to the adder 10 from a motion-compensated predictor 8 and added to the predictive-error signal to reproduce a video signal of a P frame. On the other hand, the video signal of an I frame is output from the adder 10 as it is because the value zero (no predictive signal) is supplied by the motion-compensated predictor 8 and added to this reproduced video signal.

The reproduced video signal of a P or an I frame is supplied to a video memory 9, the switch 11 and also a motion estimator 16.

The video memory 9 once stores the video signal of a P or an I frame and supplies it to the motion-compensated predictor 8. For the video signal of a P frame, the predictor 8 processes the video signal of the reference P frame by motion-compensation according to the motion vector (MV) information supplied by the variable-length decoder 3. This motion-compensation produces a predictive signal which is then supplied to the adder 10 as disclosed above. Contrary to this, the motion-compensated predictor 8 outputs the value zero for the video signal of an I frame as disclosed above.

(Re-encoding for Conversion of I to P Frame)

The switch 11 is controlled in accordance with the control information which is supplied by the frame separator 2 and synchronized with the input frames to supply the video signals of the first I frames that will be converted into P frames to a subtracter 12. The video signals of the other frames are supplied to a video memory 18.

A predictive signal is supplied to the subtracter 12 from a motion-compensated predictor 17 and subtracted from a video signal of a first I frame that will be converted into a P frame. This subtraction produces a predictive error signal which is supplied to a DCT 13. The predictive error signal is transformed into DCT coefficients which are supplied to a quantizer 14. The quantizer 14 quantizes the DCT coefficients at a predetermined stepsize to produce DCT coefficients of fixed-length codes which are supplied to a variable-length encoder 15. The encoder 15 encodes (re-encodes) the DCT coefficients of fixed-length codes to produce an encoded predictive error signal of a P frame which originally was an I frame.

The video signals of the frames other than the first I frames and having been stored in the video memory 18 are supplied to the motion-compensated predictor 17 as reference frames. These reference frames are not subjected to the re-encoding for conversion of I to P frame because the re-encoding is not performed continuously in this embodiment. The video signals reproduced by the decoding disclosed above can be used as reference frames. This eliminates local decoding for reproduction of reference frames in the re-encoding.

The motion-compensated predictor 17 produces interframe predictive signals in accordance with motion vectors (MVs) supplied by the motion estimator 16. The interframe predictive signals are supplied to the subtracter 12 for interframe predictive coding.

The motion estimator 16 detects the MVs between the frames to be subjected to the re-encoding and the reference frames. This is because no MVs exist for the frames to be subjected to the re-encoding which were originally I frames. However, MPEG standards may transfer MVs for correction of code errors in I frame. Such MVs can be used for re-encoding without motion estimation if code-error correction is required.

The motion vectors MVs detected by the motion estimator 16 are further supplied to the variable-length encoder 15 and encoded into fixed-length codes. The encoder 15 supplies the encoded predictive error signals of P frames (originally I frames) and the encoded MVs to the frame multiplexor 6.

The frame multiplexor 6 multiplexes the outputs of the frame separator 2 and those of the variable-length encoder 15 for each frame to output a bitstream through an output terminal 7.

As disclosed, a broadcasted bitstream to be stored in a storage medium does not require many I frames. On the other hand, a bitstream to be processed by video tape recorders for TV program production requires many I frames for stable picture quality and editability. Such bitstream also requires B frames but not P frames. One I frame is set per a couple of frames in a bitstream with relatively high transfer rate due to a large amount of I frame codes.

Second Embodiment

The second embodiment disclosed below is a moving picture bitstream conversion apparatus suitable for converting a bitstream of I and P frames into another bitstream for usual TV broadcasting, such as terrestrial TV broadcasting. Like the first embodiment, the second embodiment requires conversion of I to P frames. The input bitstream for the second embodiment however does not include P frames.

Figure 2:
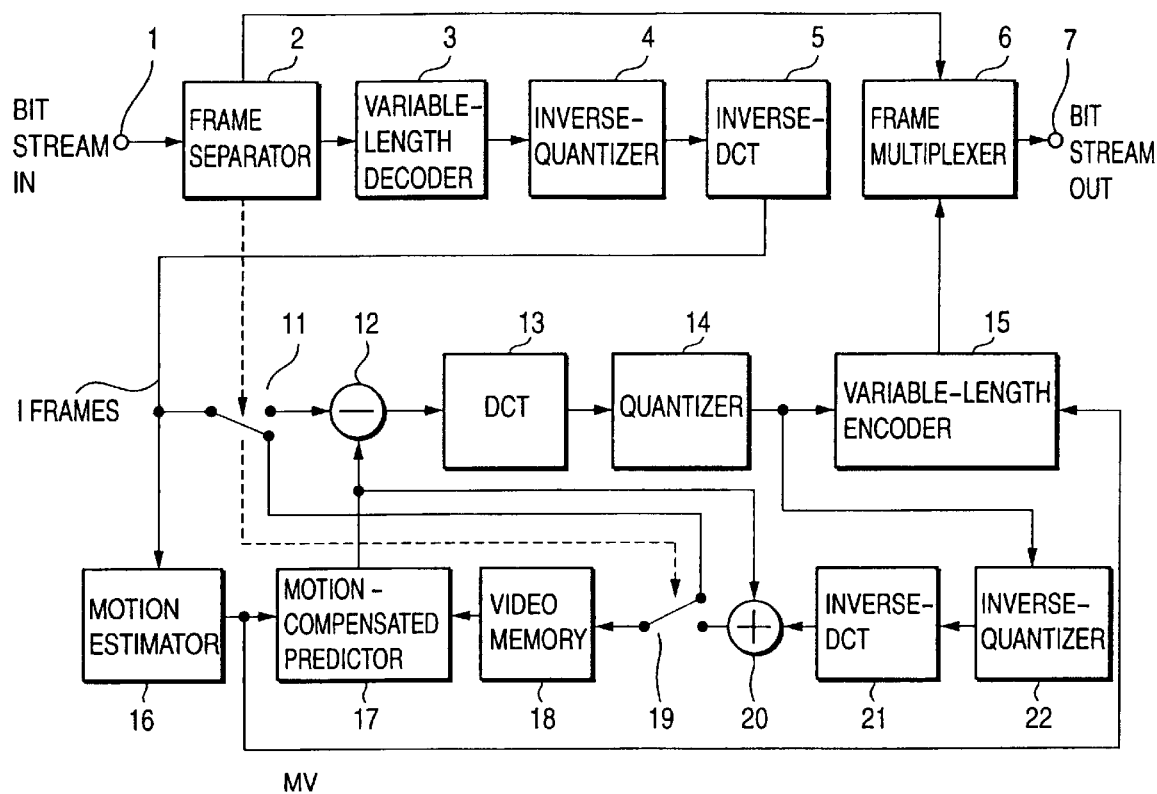
FIG. 2 shows a block diagram of the second preferred embodiment of a moving picture bitstream conversion apparatus according to the present invention.

Shown in FIG. 2 is a block diagram of the second preferred embodiment of a moving picture bitstream conversion apparatus according to the present invention.

Elements in the second embodiment that are the same as or analogous to elements in the first embodiment are referenced by the same reference numerals and will not be explained in detail.

The apparatus shown in FIG. 2 does not have interframe processing sections such as the motion-compensated predictor 8, video memory 9 and adder 10 shown in FIG. 1. Instead, the apparatus has a switch 19, an adder 20, an inverse-DCT 21 and an inverse-quantizer 22 for local decoding for reproduction of reference frames in re-encoding.

(Decoding)

In FIG. 2, a bitstream of I and B frames that has been encoded by motion-compensated interframe predictive coding is supplied to the frame separator 2 through the input terminal 1. The I frames are only supplied to the variable-length decoder 3.

All the frames except the first I frames that will be converted into P frames are supplied to the frame multiplexer 6. One I frame, for example, for every 15-th frame is set as the second I frame that will not be converted into a P frame. This I frame interval is predetermined and controlled in accordance with a frame number assigned to the header of each frame of the input bitstream. Control information indicating the frame numbers for controlling the I frame interval is supplied from the frame separator 2 to the switches 11 and 19.

The I frames supplied to the variable-length decoder 3 are decoded by the decoder 3, inverse-quantizer 4 and inverse-DCT 5 to reproduce video signals, like the first embodiment shown in FIG. 1. The reproduced video signals of the I frames are supplied to the switch 11 and motion estimator 16.

(Re-encoding for Conversion of I to P Frame)

The reproduced video signals of the first I frames that will be converted into P frames are supplied to the subtracter 12 via the switch 11 in accordance with the control information supplied by the frame separator 2 and synchronized with the input frames. The reproduced video signals of the I frames other than the first I frames are supplied to the video memory 18 via the switches 11 and 19 in accordance with the control information.

The reproduced video signals of the first I frames are processed by the subtracter 12, DCT 13 and quanitizer 14 to produce predictive error signals like the apparatus shown in FIG. 1.

The predictive error signals are supplied to the variable-length encoder 15 and the inverse-quantizer 22. The predictive error signals and also the motion vectors (MVs) supplied from the motion estimater 16 to the variable-length encoder 15 are encoded (re-encoded) with the variable-length codes. The encoded predictive error signals and the MVs are further multiplexed by the variable-length encoder 15 to produce a bitstream which is then supplied to the frame multiplxer 6. The bitstream is multiplexed with the output of the frame separator 2 and output via the output terminal 7 like the first embodiment.

The second embodiment requires local decoding sections for reproduction of reference frames for continuous re-encoding using the reference frames which are P frames converted from I frames. For local decoding, the inverse-quantizer 22 and inverse-DCT 21 apply the inverse processing of the DCT 13 and quantizer 14 to the output of the qnantizer 14 to reproduce the predictive error signals.

The reproduced predictive error signals are supplied to the adder 20 and added to the predictive signal supplied by the motion-compensated predictor 17 to reproduce video signals of reference frames. The video signals are supplied to the video memory 18 via the switch 19. In detail, the signals supplied to the memory 18 are the video signals locally decoded by re-encoding for the frames which have been converted into P frames, and the decoded video signals of the original bitstream for the frames which have been I frames without conversion.

The video signals of reference frames stored into the video memory 18 are supplied to the motion-compensated predictor 17 and processed to be interframe predictive signals in accordance with the MVs supplied by the motion estimator 16. The interframe predictive signals are then supplied to the subtracter 12 and adder 20. The motion estimator 16 detects the MVs between the reference frames and the frames to be encoded. The MVs are supplied to the variable-length encoder 15 and the motion-compensated predictor 17. The remaining processing for output bitstream multiplexing performed by the frame multiplxer 6 is the same for the first embodiment.

Third Embodiment

Figure 3:
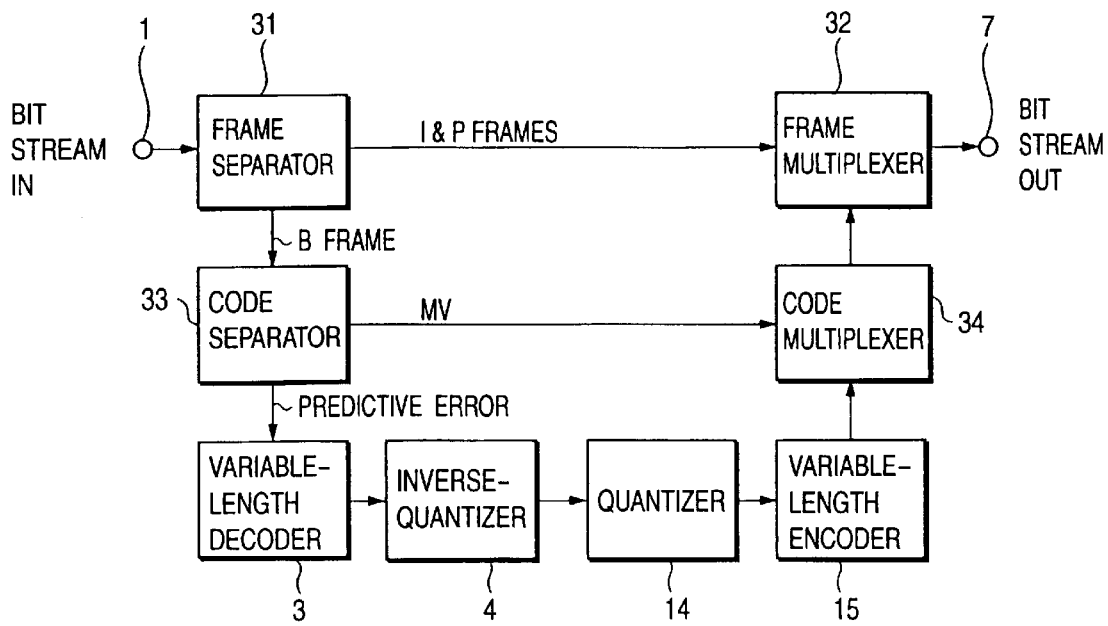
FIG. 3 shows a block diagram of the third preferred embodiment of a moving picture bitstream conversion apparatus according to the present invention.

The third embodiment according to the present invention will be disclosed with reference to FIG. 3.

The apparatus shown in FIG. 3 changes quantization (re-quantization) not interframe prediction before and after re-encoding. Video signals decoded by the apparatus of FIG. 3 would include errors due to the re-quantization. However, such errors do not affect frames other than B frames because frames subjected to the re-quantization are B frames only and these frames are not used as reference frames for interframe prediction, thus no accumulation of errors.

Elements in the third embodiment that are the same as or analogous to elements in the first embodiment are referenced by the same reference numerals and will not be explained in detail.

Compared to the apparatus of FIG. 1, the apparatus shown in FIG. 3 does not have DCT processing sections and interframe prediction sections, but has a code separator 33 and a code multiplexer 34. Furthermore,the apparatus has a frame separator 31 and a frame multiplexer 32 whose functions are different from those of the counterparts shown in FIG. 1.

(Decoding)

A bitstream that has been encoded by motion-compensated interframe predictive coding is supplied to the frame separator 31 through the input terminal 1. The bitstream is separated into I and P frames which will be used as reference frames for prediction, and B frames which will not be used as such reference frames.

The I and P frames are supplied to the frame multiplexer 32. On the other hand, the B frames are supplied to the code separator 33 and separated into codes of, such as MVs for prediction and codes of predictive error signals of DCT coefficients. The codes for prediction (MVs) and those of predictive error signals are supplied to the multiplexer 34 and the variable-length decoder 3, respectively. The codes of the predictive error signals of B frames are returned to the fixed-length codes by the variable-length decoder 3. The fixed-length codes are inversely quantized by the inverse-quantizer 4 to reproduce DCT coefficients.

(Re-encoding)

The reproduced DCT coefficients of the predictive error signals are supplied to the quantizer 14 and quantized again at a predetermined stepsize. The DCT coefficients of the fixed-length codes are supplied to the variable-length encoder 15 and encoded with variable-length codes. The variable-length codes of the predictive error signals are supplied to the code multiplxerr 34 and multiplexed with the codes of the MVs to produce a bitstream. The bitstream is then supplied to the frame multiplexer 32. The I and P frames from the frame separator 31 and the re-quantized B frames are multiplexed and output via the output terminal 7.

The third embodiment can be combined with the first or the second embodiment. I and P frames are re-encoded as disclosed in the first or the second embodiment, and the B frames are re-encoded as disclosed in the third embodiment.

(Amount of codes)

Figure 4A:
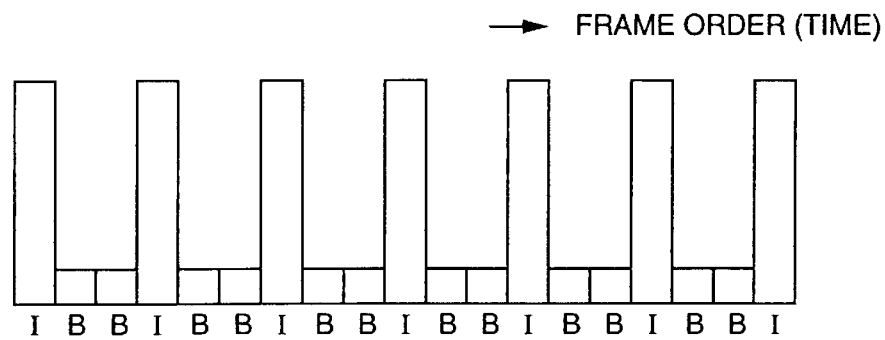
FIGS. 4A, 4B and 4C illustrate change in amount of codes of I, P and B frames due to bitstream conversion.
Figure 4B:
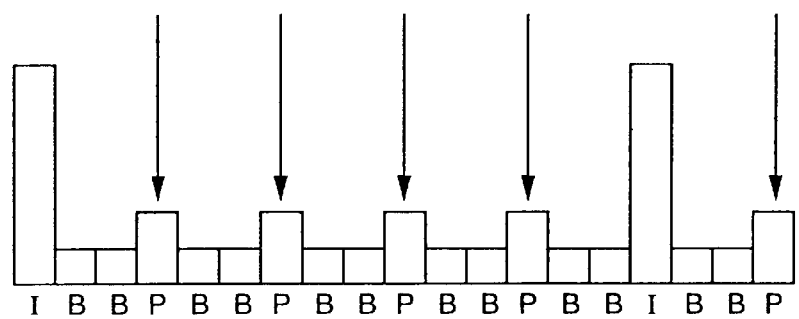
Figure 4C:
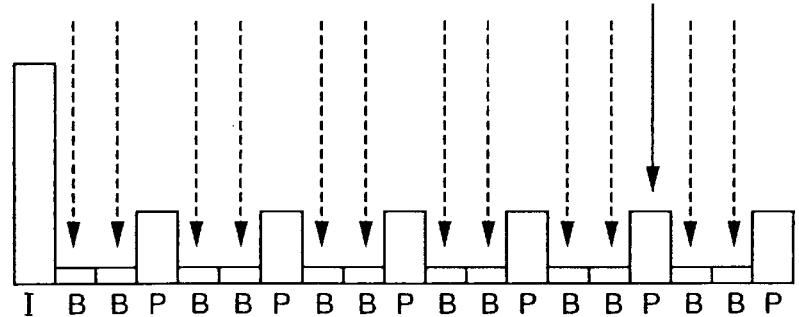

Illustrated in FIGS. 4A, 4B and 4C are change in amount of codes of I, P and B frames due to bitstream conversion.

The bitstream for TV program production (FIG. 4A) consists of I frames (one I frame for every third frame) and B frames for the other frames. The transfer rate for 30 frames/sec., is 12 Mbps when the code amounts of one I and B frame is 900 and 150 kbits, respectively, on average in this type of bitstream.

Frame types, such as I, P and B that constitute a bitstream depend on usage. Bitstreams used for TV broadcasting (FIG. 4B), such as satellite and terrestrial broadcasting, and CATV include one I frame, for instance, for every 15-th frame (0.5 sec.). Because a long I frame interval cannot be taken due to the impossibility of decoding until the arrival of the next I frame when a bitstream to be decoded is changed to another due to TV channel switching. Such bitstreams for TV broadcasting include, for instance, one P frame for every third frame and B frames for the other frames other than the I frames.

A broadcasted bitstream to be stored in a storage medium (FIG. 4C) does not require such I frames as one I frame for every 15-th frame due to no TV channel switching in reproduction. One I frame may be allocated for every 60-th frame (two seconds) for refreshing to prevent increase in computation processing errors. Some I frames of broadcasted bitstream for such refreshing are converted into P frames.

A bitstream for TV braodcasting is processed by the apparatus shown in FIG. 2 in such a way that all the B frames and an I frame for every 15-th frame remain as they are but the other I frames are converted into P frames. The processed bitstream includes one I frame for every 15-th frame and one P frame for every third frame, the P frame being originally an I frame before conversion. The amount of codes of one P frame is 300 kbits on average by conversion and the transfer rate is 7.2 Mbps.

A bitstream to be stored in a storage medium is processed by the apparatus shown in FIG. 1 in such a way that an I frame for every 60-th frame remains as it is but the other I frames are converted into P frames. A bitstream processed by the apparatus of FIG. 3 contains, for example, 75 kbits for each B frame by conversion and the transfer rate is 4.8 Mbps.

As disclosed above, according to the present invention, frames of an input bitstream which are used as reference frames for prediction are only decoded and some independent (I) frames are re-encoded as the reference frames. On the other hand, bidirectionally predictive-coded (B) frames are not decoded but multiplexed as they are with the re-encoded frames.

The present invention thus achieves less amount of codes in decoding and re-encoding. In detail, independent frames are converted into predictive-coded frames with less amount of codes. This frame conversion achieves less amount of codes, or the transfer rate. Re-encoding only for independent frames achieves less reduction in quality of reproduced pictures.

Furthermore, the present invention achieves less amount of codes of bidirectionally predictive-coded frames by re-quantizing predictive error signals only for these frames which are not used as reference frames for prediction. No change in amount of codes of independent and predictive-coded frames results in decrease in the total amount of codes, or the transfer rate. Re-quantization only for bidirectionally predictive-coded frames results in change of reproduced pictures in these frames only. No interframe prediction processing for decoding and re-encoding achieves extremely less amount of codes to be processed.

What is claimed is:

1. An apparatus for converting a bitstream of moving pictures which has been processed by motion-compensated interframe prediction, the apparatus comprising:

a separator to separate an input bitstream into first codes of a predetermined number of intra-coded frames, second codes of frames to be used as reference frames for interframe prediction and third codes of frames other than the frames of the first and second codes;

a decoder to decode the first and the second codes to reproduce a first and a second video signal, respectively;

an encoder to encode the first video signal by interframe predictive coding using the second video signal as a reference video signal to obtain re-encoded codes; and a multiplexer to multiplex the re-encoded, the second and the third codes to obtain a bitstream for which a picture encoding method for the input bitstream is converted.

2. An apparatus for converting a bitstream of moving pictures which has been processed by motion-compensated interframe prediction, the apparatus comprising:

a frame separator to separate an input bitstream into first codes of frames not to be used as reference frames for interframe prediction and second codes of frames to be used as the reference frames;

a code separator to separate the first codes into codes for interframe prediction and codes of interframe predictive error signals;

a decoder to decode the codes of interframe predictive error signals by using variable-length codes and invsersely quantize the decoded codes to reproduce values of the interframe predictive error signals;

re-encoder to quantize the reproduced values again and encode the quantized values by using variable-length codes to obtain re-encoded predictive error signals;

a code multiplexer to multiplex the re-encoded predictive error signals and the codes for interframe prediction to obtain third codes; and a frame multiplexer to multiplex the second codes and the third codes to obtain a bitstream to which an amount of codes of the input bitstream is converted.

3. A method of converting a bitstream of moving pictures which has been processed by motion-compensated interframe prediction, the method comprising the steps of:

separating an input bitstream into first codes of a predetermined number of intra-coded frames, second codes of frames to be used as reference frames for interframe prediction and third codes of frames other than the frames of the first and second codes;

decoding the first and the second codes to reproduce a first and a second video signal, respectively;

encoding the first video signal by interframe predictive coding using the second video signal as a reference video signal to obtain re-encoded codes; and multiplexing the re-encoded, the second and the third codes to obtain a bitstream for which a picture encoding method for the input bitstream is converted.

4. A method of converting a bitstream of moving pictures which has been processed by motion-compensated interframe prediction, the method comprising the steps of:

separating an input bitstream into first codes of frames not to be used as reference frames for interframe prediction and second codes of frames to be used as the reference frames;

separating the first codes into codes for interframe prediction and codes of interframe predictive error signals;

decoding the codes of interframe predictive error signals by using variable-length codes and invsersely quantize the decoded codes to reproduce values of the interframe predictive error signals;

quantizing the reproduced values again and encoding the quantized values by using variable-length codes to obtain re-encoded predictive error signals;

multiplexing the re-encoded predictive error signals and the codes for interframe prediction to obtain third codes; and multiplexing the second codes and the third codes to obtain a bitstream to which an amount of codes of the input bitstream is converted.

* * * * *